United States Patent [19]

Magistrelli

[11] Patent Number: 5,090,337
[45] Date of Patent: Feb. 25, 1992

[54] SHELVING WITH ADJUSTABLE SHELVES PARTICULARLY SUITABLE FOR GOODS VANS

[76] Inventor: Maurizio Magistrelli, Via Statale 11 n.27, 20010 Vittuone (Milano), Italy

[21] Appl. No.: 474,814
[22] PCT Filed: Mar. 25, 1988
[86] PCT No.: PCT/IT88/00021
   § 371 Date: Jun. 29, 1990
   § 102(e) Date: Jun. 29, 1990
[87] PCT Pub. No.: WO89/07061
   PCT Pub. Date: Aug. 10, 1989

[30] Foreign Application Priority Data

Feb. 8, 1988 [IT] Italy .................. 20606/88[U]

[51] Int. Cl.[5] .................................. A47B 1/06
[52] U.S. Cl. ........................... 108/67; 160/206
[58] Field of Search ............... 49/127; 160/201, 206; 108/34, 67, 63

[56] References Cited

U.S. PATENT DOCUMENTS

| | | | |
|---|---|---|---|
| 2,577,884 | 12/1957 | Garubo | 160/206 |
| 3,086,256 | 3/1963 | Schieber . | |
| 3,649,072 | 3/1972 | Cross . | |
| 4,350,399 | 9/1982 | Berton et al. | 160/206 |
| 4,384,379 | 5/1983 | Yamada | 108/67 |

FOREIGN PATENT DOCUMENTS 0093814 11/1983 European Pat. Off. .
2341455 9/1977 France .

Primary Examiner—Kenneth J. Dorner
Assistant Examiner—Gerald A. Anderson
Attorney, Agent, or Firm—Michael J. Striker

[57] ABSTRACT

The shelving apparatus, especially for a goods-carrying motor vehicle, includes two horizontal guide rods, each having a fixed support mounted thereon as well as a slider, at least one adjustable shelf including a set of rectangular components, each of the rectangular components being positionable lengthwise side-by-side, and two foldable parallelogram devices (80,81) for mounting the rectangular components on the horizontal guide rods. Each of the parallelogram devices includes a plurality of adjacent pivotally interconnected pairs of X-bars and is connected to one of the fixed supports at one end and one of the sliders at the other end, so that each of the rectangular components is movably connected by each of the foldable parallelogram devices to each of the guide rods, and, when the sliders are positioned at a minimum distance from the fixed supports, all the rectangular components stand substantially vertical, but, when the sliders are moved from the minimum position adjacent the fixed supports, the X-bars become inclined and, when the sliders have been moved as far as possible frm the fixed supports, the rectangular components are positioned in the substantially horizontal orientation on the guide rods thus forming a substantially continuous shelf.

5 Claims, 6 Drawing Sheets

SHELVING WITH ADJUSTABLE SHELVES PARTICULARLY SUITABLE FOR GOODS VANS

BACKGROUND OF THE INVENTION

The present invention relates to a shelving apparatus, especially for a motor vehicle such as a van.

A shelving apparatus for a motor vehicle is known and includes one or more fixed or moveable shelves on which objects or goods of various kinds can be placed.

A comparatively large quantity of objects can be stored within a small spaced using shelves set at different heights. The same quantity of objects takes up much more space, if stored on a single planar surface.

Most goods-carrying vehicles generally have only one loading platform consisting of the floor of the vehicle. When the goods-carrying vehicles is filled with goods for transport, the goods must be piled on top of each other with consequent risk of damage, especially when subjected to bumping or shaking due to vehicle movements.

If some of the goods resting on the loading platform of the typical goods-carrying vehicle must be unloaded at an initial delivery point, those placed on top of them must be first removed. To avoid doing that, loading must be carefully planned and the last of those items to be unloaded must be loaded first. This requirement creates difficulties both in regard to arranging the goods in the best way in the vehicle and also in regard to the time required for loading and unloading as well as devising a loading plan.

EP-A-0 093 814 discloses a vehicle for transport of goods having a supplementary shelf for goods that can be assembled and disassembled. This supplementary shelf comprises a plurality of rectangular components mounted with their long sides placed against one another. The sections slide on rolling means inside lateral guides fixed to the sides of the space used for carrying goods. The guides can be mounted at various heights on uprights by supporting means. Since the supplementary shelf is composed of moveable components, the shelf need only be assembled when required, i.e. when the height and quantity of the goods require it or when an extra shelf is useful. If the height of the goods makes it necessary, or if there is a lesser quantity of goods, the supplementary shelf can be taken down.

The usefulness of the above-described supplementary shelf is, however, to some extent diminished by the necessity of having to put up or take down the rectangular components one by one during assembly and disassembly, and by the space such components occupy, when the shelf is not assembled for use.

Also fixing the shelf components of the supplementary shelf into the lateral guides requires extra work and, if jerky movements made by the vehicle moving on a rough surface shakes the components loose, the goods may be damaged, especially if they are fragile.

The above disadvantages obviously would become greater, if there were more than one supplementary shelf, since the resulting operational complexities might make the supplementary shelf arrangement impractical.

These factors place limits on the use of the supplementary shelf and difficulties might arise, if loading and unloading of the goods-carrying vehicle, must be done as quickly and simply as possible.

SUMMARY OF THE INVENTION

It is therefore an object of the present invention to provide a shelving apparatus with an adjustable shelf, particularly for a goods-carrying vehicle, which avoids the above-mentioned disadvantages.

According to the present invention, the shelving apparatus comprises at least one longitudinally-extending, substantially horizontal supporting member mounted in the loading space; a plurality of rectangular components supported on the supporting member, but movable on it, with their longitudinal sides extending across the supporting member and being lengthwise side-by-side; means for pivotally connecting the rectangular components, so that at least one set of the rectangular components are foldable into a folded configuration in which each of the rectangular components is substantially vertical, and so that the set of the rectangular components is also unfoldable into an unfolded configuration, in which each of the rectangular components of the set is substantially horizontal and placed adjacent to another rectangular component with the longitudinal sides of adjacent rectangular components resting against each other, so that the rectangular components form an adjustable shelf for the goods; and a means for supporting the rectangular components on the supporting member structured so that the rectangular components are foldable into the folded configuration and unfoldable into the unfolded configuration to form an adjustable shelf.

The means for pivotally connecting the rectangular components with each other comprises two parallelogram devices each including a set of adjacent pivotally-connected pairs of X-bars. The set of pairs of X-bars include a first pair of said X-bars at one end of the set and a second pair at another end of the set.

Each of the X-bars in each of the pairs of X-bars of a parallelogram device is advantageously pivotally connected with the other X-bar of that pair at a central articulation or pivot pin. Also each X-bar of each pair of X-bars is pivotally connected at each opposite end thereof by an end articulation with another X-bar in an adjacent pair of X-bars.

The supporting member advantageously comprises two substantially horizontal guide rods spaced from each other and mounted in the loading space.

The means for supporting the rectangular components on the guide rods advantageously includes two fixed supports and at least two sliders. Each of the guide rods has one of the fixed supports attached thereto and at least one slider slidable to and from the fixed support. A lower end of the outer X-bar of the first pair of the X-bars of one of the parallelogram devices to which the rectangular components are attached is advantageously pivotally connected to one of the sliders which slide on one of the guide rods, while a lower end of an inner X-bar of the second pair of X-bars of that parallelogram device is pivotally connected to the corresponding fixed support. Each transverse side of each rectangular component is rigidly attached between X-bars in both of the parallelogram devices.

There may be two sets of foldable rectangular components in one adjustable shelf and more than one adjustable shelf in the shelving apparatus of the invention.

The space occupied by an adjustable shelf according to the invention can obviously be freed by pushing the horizontal rectangular components and sliders toward the inside of the shelving apparatus.

The guide rods and the adjustable shelves on them can be releasably mounted at their two ends on a pair of uprights each coinciding with a corner of the shelving apparatus. The uprights can have an inner column passing through holes in the guide rods and also a set of upwardly-opening slots one above the other, in which slidable horizontal pins mounted in the guide rods can engage to secure the guide rods in position. It is thus possible to move an adjustable shelf from one level to another by sliding the pins of its guide rods inwardly to release the guide rods from attachment with the uprights.

The adjacent edges of the rectangular components can be made to fit and support each other in the horizontal position, when they form the adjustable shelf. Advantageously one longitudinal side of each rectangular component has a longitudinally-grooved member and the other side has a tongue piece, which engages in the longitudinally-grooved member of the adjacent rectangular component, when the rectangular components are positioned horizontally. This provides a firm connection between one rectangular component and the other, when a shelf is formed by them.

In one embodiment of our invention, the lateral parallelogram devices each have another slider moving along the guide rods and connected between one slider and the fixed support. There are two sets of pivotally connected rectangular components, one set being pivotally connected between the intermediate slider and the fixed support, the other being pivotally connected between the intermediate slider and the one slider. In this case then, one can orient one set of rectangular components horizontally (unfolded) and the other set vertically (folded up), so that the one set is ready for loading and the other set stands vertically out of the way and out-of-use. A free volume can thus be created in the loading space of about half the shelving, so that the amount of shelving actually used can be adapted to the quantity and type of goods, or else to facilitate access for loading and unloading.

The structure of the invention as summarized above is particularly advantageous. The uprights in the loading space of the goods-carrying vehicle take up comparatively little space, when the shelves are folded up in the out-of-use configuration. The height of each shelf can be varied as required by moving the shelf from one of the sets of slots to another of the sets of slots in the uprights. Each shelf can be divided into two separate parts, one part folded up and the other part unfolded with the rectangular components horizontal forming the shelf. In this way, for example, half the loading volume can be left almost entirely free. The easy change-over of a shelf from the loading position to the stored position facilitates the storage and transport of packages, which are as tall as the available height of the loading space in the van, and also small packages which are loaded on the shelves. Since the upper shelves can be collapsed in the stored position, the unloading of goods on the lower shelves is made easier. The structure of the shelving apparatus is particularly convenient, when transporting fragile goods and when loading or unloading must be done at several different locations. Further, the shelving apparatus is comparatively inexpensive as well as easy to use.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE PREFERRED EMBODIMENTS

Figure 1:
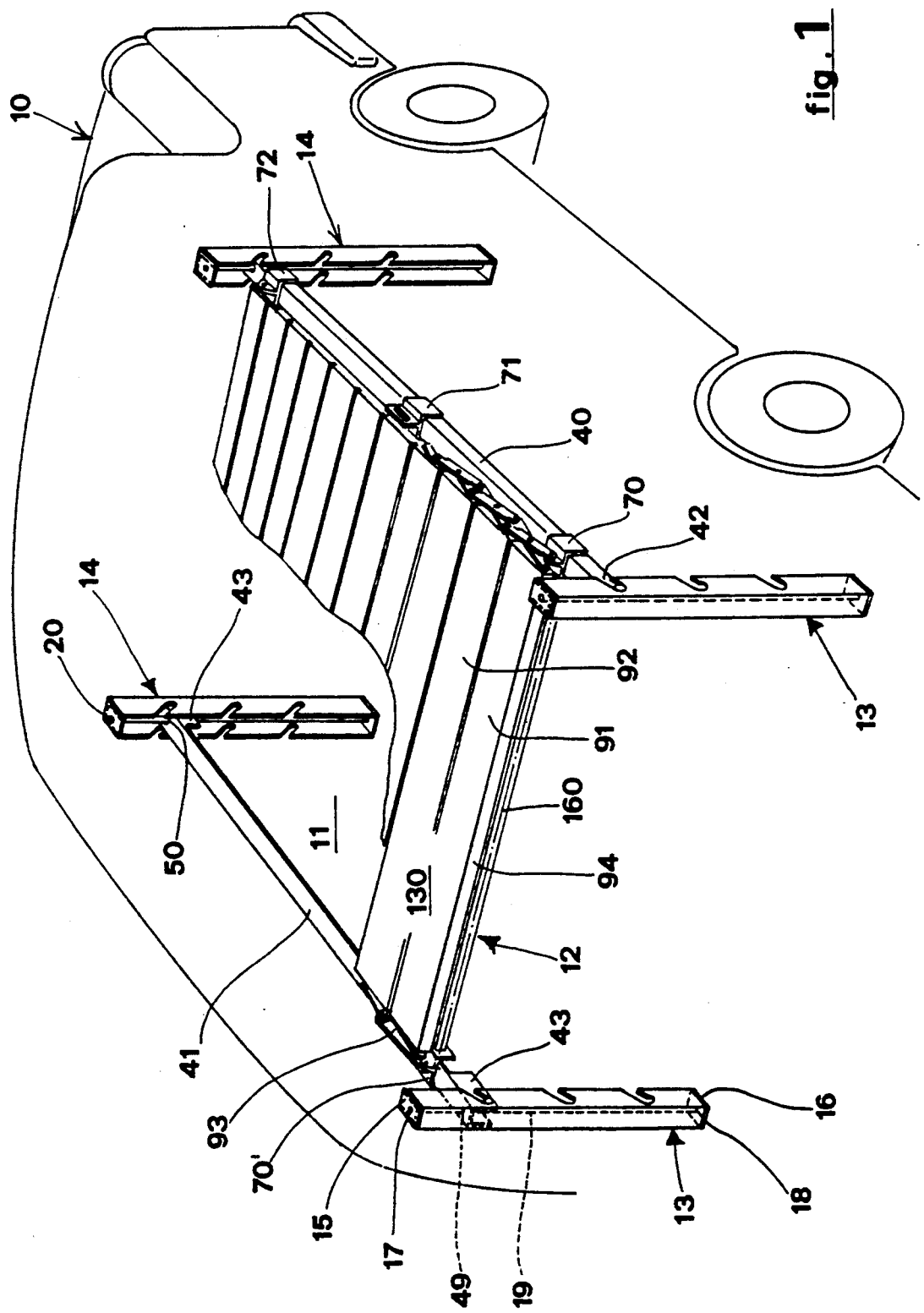
FIG. 1 is a perspective view of a shelving apparatus in a goods-carrying vehicle according to the invention including a single shelf, ready for loading.

The shelving apparatus 12 includes two pairs of uprights 13, 14 which are fixed to the inner sides of the van 10 in the loading space 11 of the van. Each of the uprights is made of U-shaped metal sheeting, is closed at its top end by a cap 15 and and at its bottom end by another cap 16.

The caps 15, 16 are provided with holes 17,18. A cylindrical column 19 or 20 is held in position in the cap in the hole 17 or 18.

Each of the uprights 13, 14 is provided with a plurality of open-ended slots 32,33 in its sides 30,31. Each slot 32,33 has a mouth 34, downwardly inclined section 35 and a round base 36. The uprights 13,14 support horizontal L-shaped cross bars or guide rods 40, 41 having U-shaped downwardly facing end pieces 42,43 formed by the side sections 44, 45.

The side sections 44,45 are provided with horizontally oriented and parallel closed slots 47,48, whose width is substantially the same as that of the slots 32,33 in the uprights 13,14. A horizontal pin 60 is provided extending between each of the slots 32,33 and passing through them. This horizontal pin 60 has a diameter which is smaller than the width of the slots so that it can move in the slots. In the end pieces 42,43 of the guide rods 40,41 there are holes 49,50 through which the columns 19,20 in the uprights 13,14 pass (FIG. 1).

Figure 4:
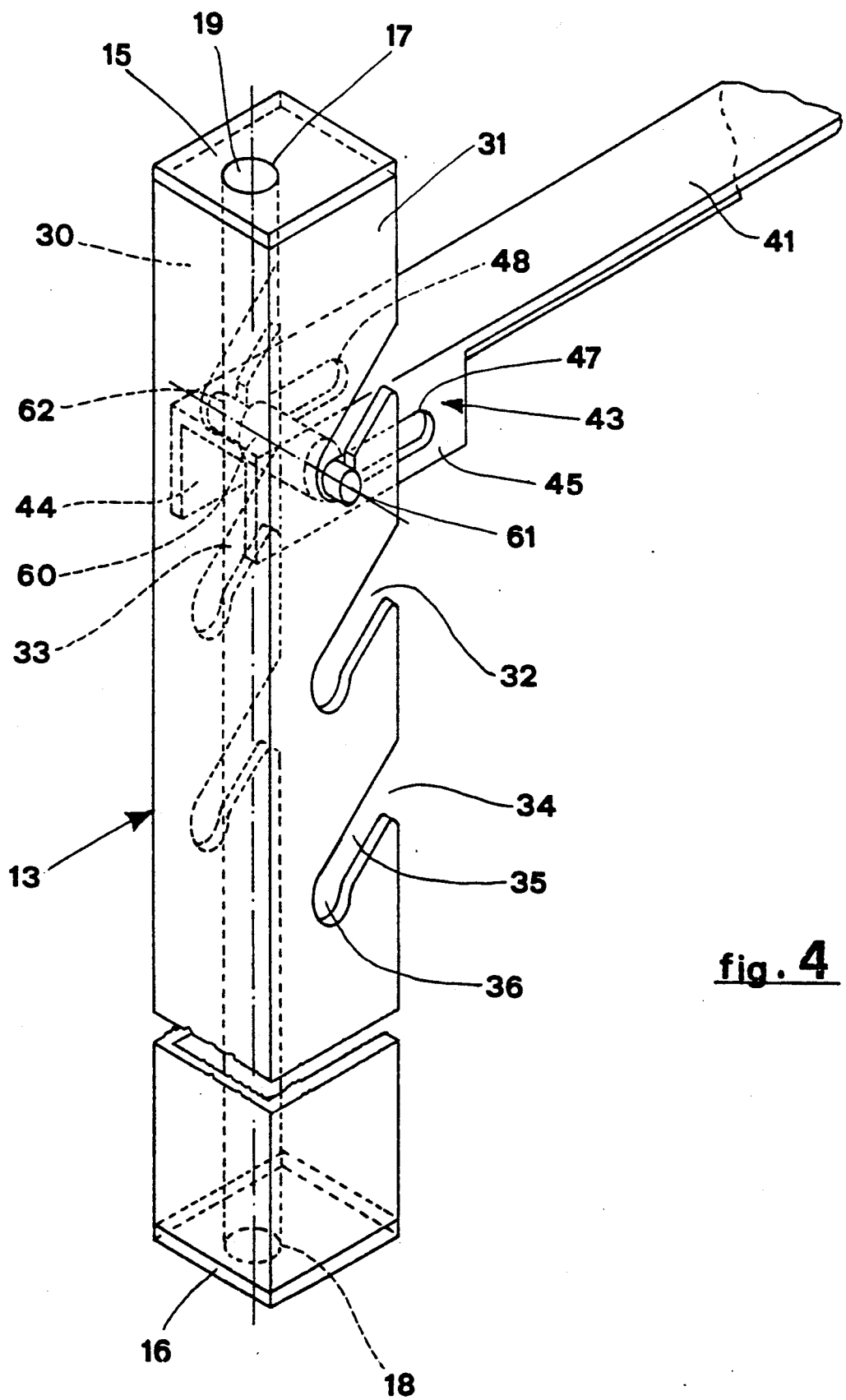
FIG. 4 is a detailed perspective view of a portion of an upright from the shelving apparatus of FIG. 1.

As can be seen from FIG. 4, the extremities or ends 61,62 of the pins 60 can enter one or the other of the pairs of open slots 32, 33 through the mouths 34 and fit in the rounded bases 36 of these slots. To raise or lower the guide rods 40, 41 the pins 60 have merely to be detached from the open slots 32,33 by moving the guide rods 40,41 upward. The extremities or ends 61, 62 of the pin 60 are then moved out from the open slot 32,33 and can be fitted into another pair of slots, either higher or lower, in the upright.

The pair of guide rods 40,41, respectively, support extremities 88 and 89 of the opposing and aligned parallelogram devices 80,81. The opposing and aligned parallelogram devices 80,81 are provided with sliders 70,70' and fixed supports 72, by which the parallelogram devices 80,81 are supported on the guide rods. When the sliders 70, 70' are moved toward the fixed supports the parallelogram device folds up, when they move away the parallelogram device unfolds.

Figure 2:
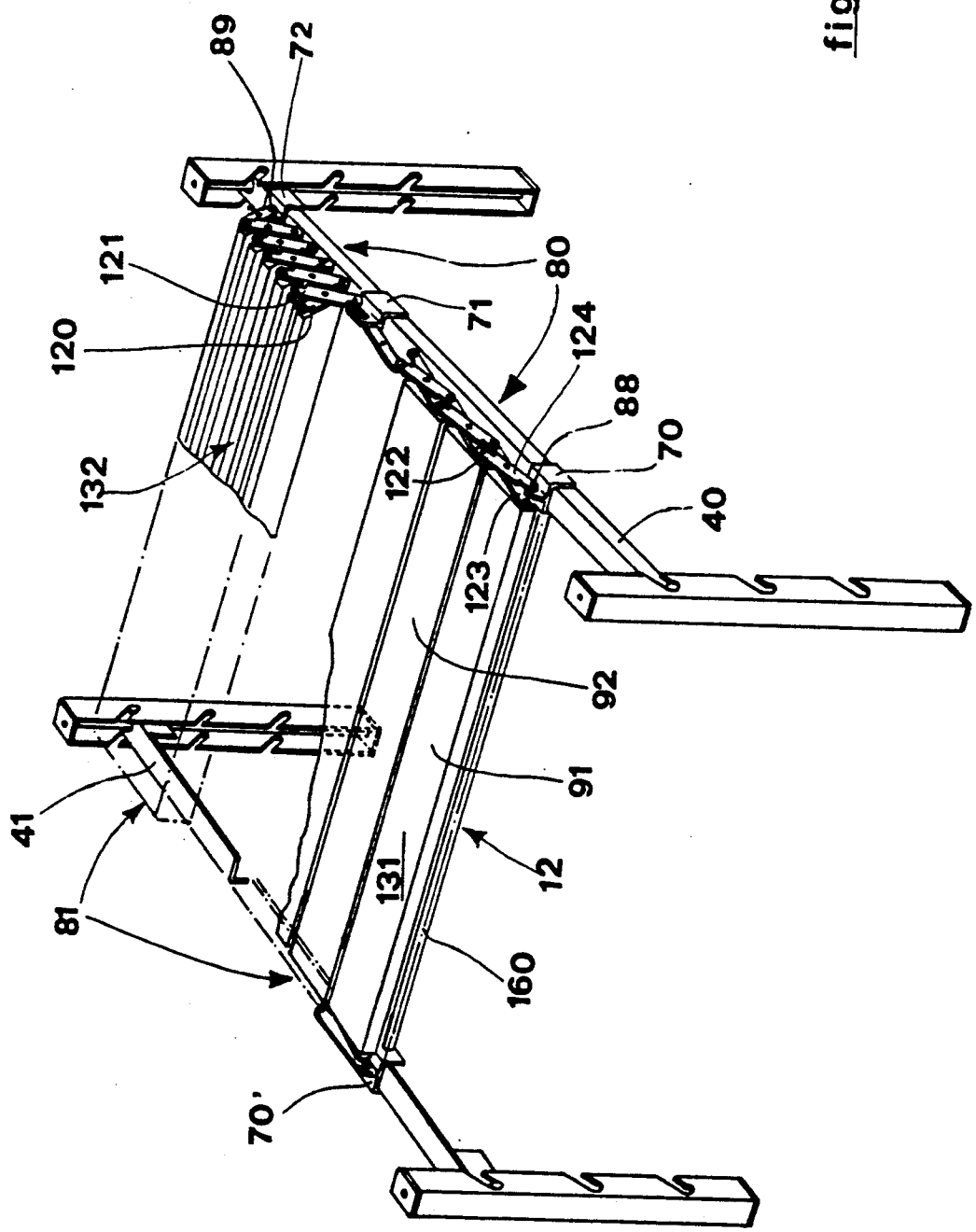
FIG. 2 is a perspective view of the shelving apparatus of FIG. 1 with one shelf, half of which is ready to receive goods and half is collapsed in a stored position.

Each of the parallelogram devices 80,81 comprises at least one set of pivotally interconnected adjacent pairs of X-bars 82,83. Each pair of X-bars is pivotally connected or articulated at their central crossing points by central articulations or pivot pins 90,91. Each pair of X-bars 82,83 is pivotally connected to both adjacent pairs of X-bars 84,85 at the end articulations 86,87 at the ends of the X-bars. Each X-bar 83,85, and others identical to them in the opposing device 81, support the rectangular components 91,92 (FIGS. 2,3 and 4).

Each of the rectangular components 91,92 has transverse sides 93 and longitudinal sides. Three holes 100, 101, 102 are provided in the transverse sides 93. One longitudinal side of each rectangular component has a continuous tongue piece 94 slightly separated or spaced from that longitudinal side. The opposite longitudinal side has a longitudinally-grooved member 95, whose cross section is U-shaped and which includes a longitudinally-extending bottom piece 96 and side piece 97. When the rectangular components are oriented horizontally, the tongue piece 94 of one component engages in the longitudinally-grooved member 95 to form a tongue-and-groove joint. This provides additional support for the shelf formed from the components.

Figure 3:
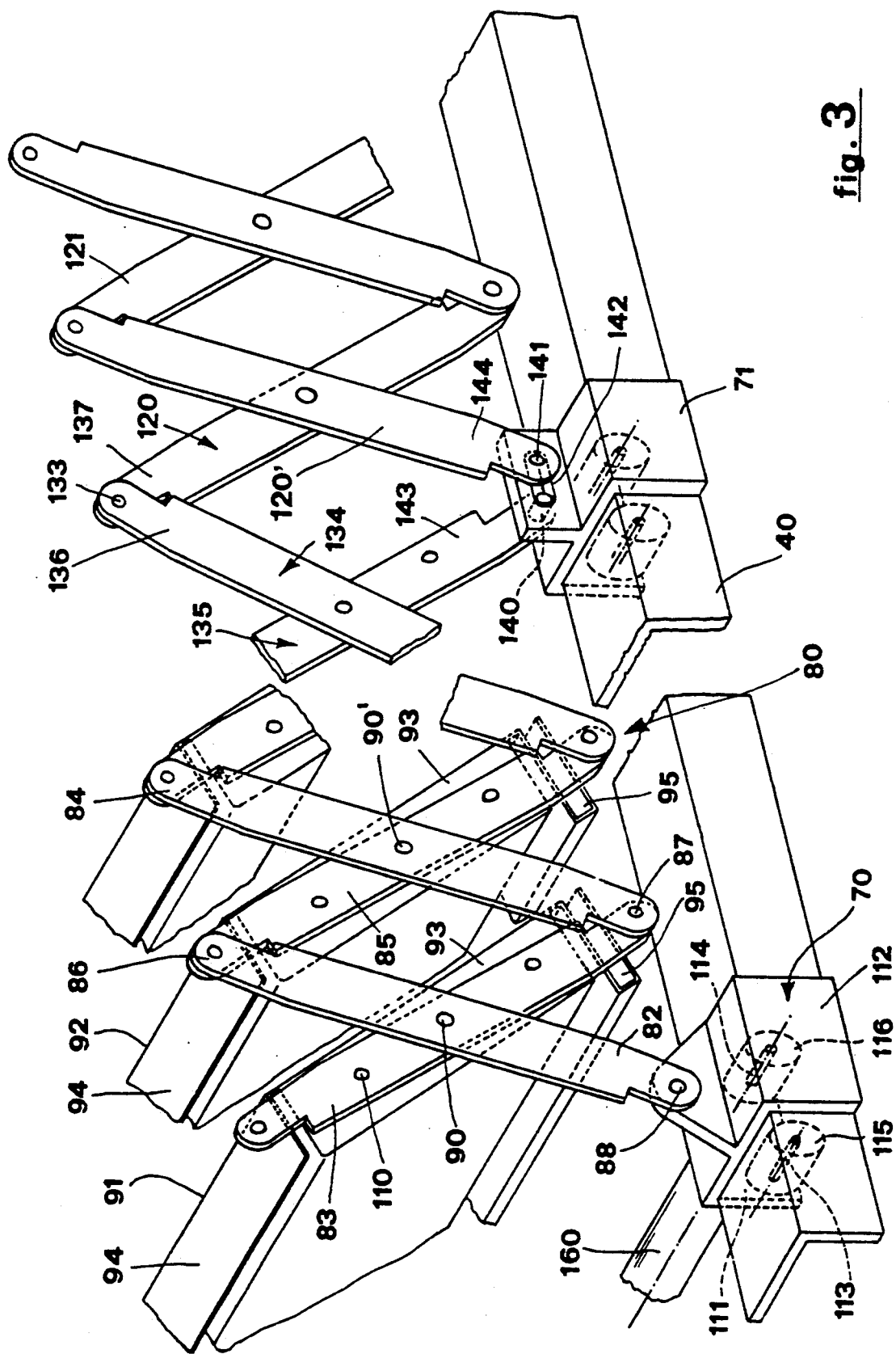
FIG. 3 is a detailed perspective view of a portion of the shelving apparatus of FIG. 1.
Figure 5:
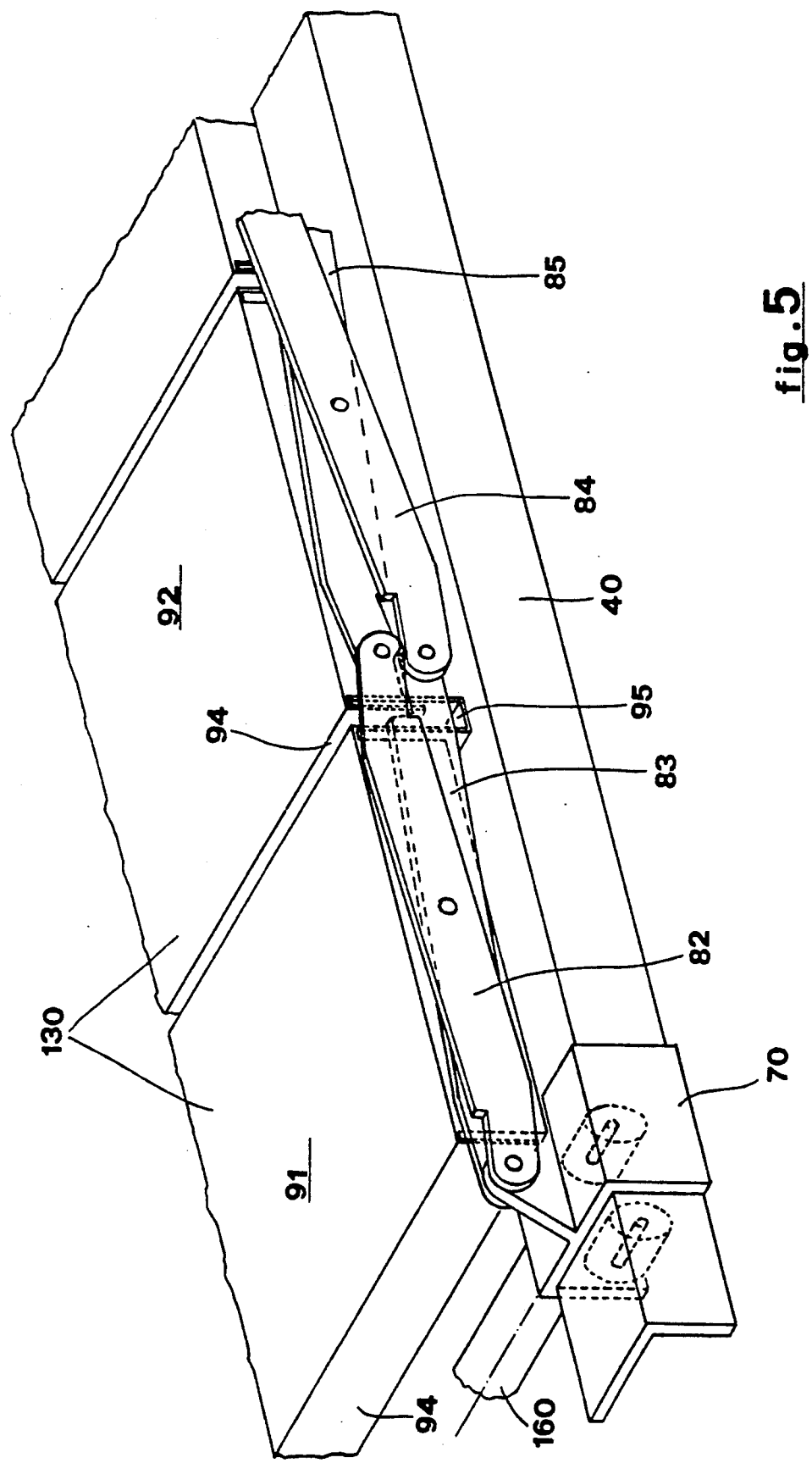
FIG. 5 is a cutaway detailed perspective view of a part of an adjustable shelf of the shelving apparatus in position ready to receive goods.
Figure 6:
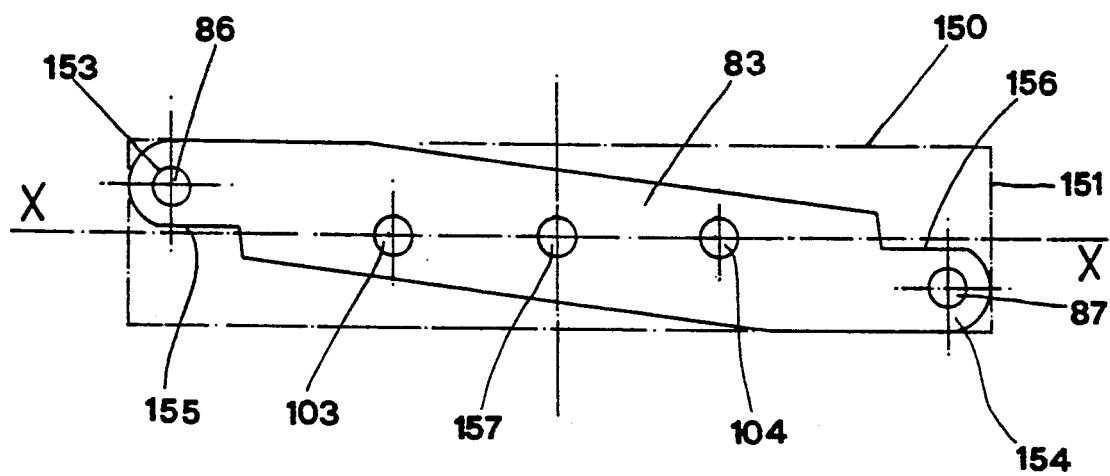
FIG. 6 is a side view of an X-bar of the parallelogram device.
Figure 7:
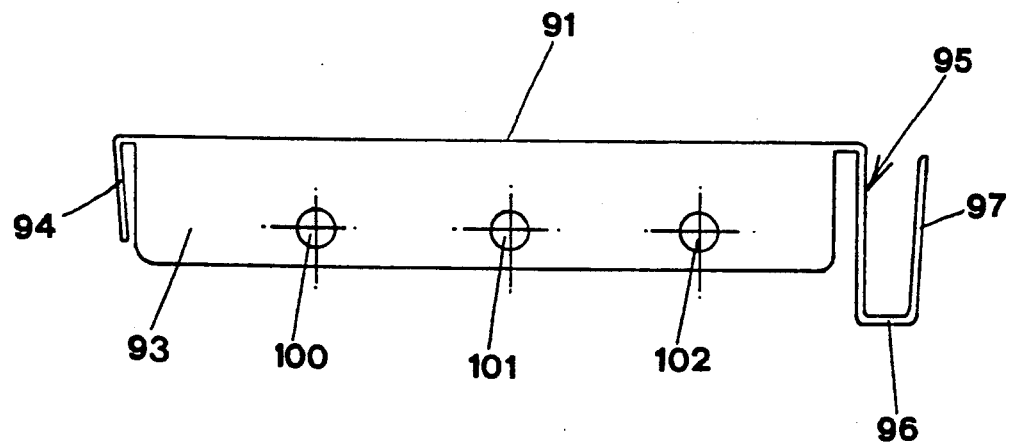
FIG. 7 is a side view of a rectangular component of a shelf from the shelving apparatus.

Each rectangular component is fixed to the X-bars 83,85 by rivets 110 passing through holes 100,102 in the transverse sides 93, and through corresponding holes 103,104 in the X-bars 83,85 (FIGS. 3,6). The position of the U-shaped sides 94,95 corresponds to that of the articulations 86,87 on the pairs of X-bars 82,83; 84,85 (FIGS. 3,5,6,7). Thus the rectangular components are attached at their ends to X-bars in both of the parallelogram devices.

The sliders 70,70, moving along the guide rods 40,41 (which act as guide rods for the sliders) each consist of a U-shaped body with sides 111,112. Pins 113, 114 are fixed to sides 111. The pins 113,114 are provide to support rotating rollers 115,116 counterpoised to the central part of the U-shaped body to allow the sliders to move freely along the horizontal part of the guide rod. As the sliders 70,70′ and intermediate slider 71 approach the fixed support 72, the pairs of X-bars 82,83; 84,85 obviously tend to line up perpendicular to the guide rods until they have assumed the nearly vertical position held by the X-bars 120,121 shown in FIG. 2. When the sliders 70,70′ and the intermediate slider 71 move away from the fixed support 72, the pairs of X-bars 82,83; 84,85 tend to align themselves parallel to the guide rods as seen in FIG. 5, and also as shown by bars 122, 123 in FIG. 2. Once the position illustrated in these Figures is reached, the side 94 of each rectangular component 92 penetrates into the U-shaped side 95 of an adjacent rectangular component 91 until a continuous shelf 130 is formed (FIGS. 1,2, 5).

The intermediate slider 71 of the guide rod 40, and obviously the corresponding one on guide rod 41, is placed between slider 70 and support 72, when it is desired to divide the shelf into two separate parts 131, 132(FIG. 2). To obtain the two independent parts, the pins 13 (FIG. 3) must simply be detached from their positions in the holes in X-bars 134 and 120 of parallelogram device 80, and those of parallelogram device 81 on the opposite side of the shelves(FIG. 2), leaving free the extremities 136,137 of the X-bars 134,120(FIG. 3).

By keeping the X-bars 134,120 articulated at articulation 133 with sliders 70 and the intermediate slider 71 moving freely on the guide rods 40,41, a single load surface 130 can be formed (FIG. 1) or else, if desired, the rectangular components 91,92 can be grouped vertically close together.

In FIG. 3 the intermediate slider 71 has two articulations 140, 141 of the X-bars freely movable in a slot 142 provided therein to avoid interference between the two ends 143, 144 of the X-bars 135,120 in the positions shown in FIG. 2 with the shelf 131 ready for loading and shelf 13 collapsed with the rectangular components nearly vertical in the out-of-use position.

FIG. 6 shows in more detail the shape of each X-bar 83 of the parallelogram devices 80,81. The X-bars each fit in a rectangle whose sides are 150 and 151 as seen in FIG. 6.

The eyelets 153,154 are substantially at one end and the other end of the axis XX so that, in the space left free by each eyelet above and below the axis XX, there is room for fitting the eyelet of a second X-bar 85 that supports the rectangular component 92 adjacent to rectangular component 91 supported by the first X-bar 83 as is seen in FIGS. 3 and 5. The X-bar 83 is also provided with holes 103,104 on the axis XX corresponding to holes 100,102 in the transverse side 93 of the rectangular component 91, also the hole 157 for articulation with the pair of X-bars 82 matching with hole 101 in the side 92 of the rectangular components. To insure simultaneous and integral operation slider 70, and slider 70′ mounted on guide rod 41, are connected by a tubular bar 160 (FIGS. 1,2,3).

It will be understood that each of the elements described above, or two or more together, may also find a useful application in other types of structures differing from the types described above.

While the invention has been illustrated and described as embodied in a shelving apparatus with adjustable shelves, especially suitable for a goods-carrying vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

I claim:

1. A shelving apparatus, especially for a goods-carrying motor vehicle, installable in a loading space into which goods are loaded and from which the goods are unloaded, said shelving apparatus comprising:
   two horizontal guide rods (40,41) spaced from each other in said loading space, each of said guide rods having two ends, also having a fixed support (72) attached thereto and and also having at least one slider (70,70′) mounted slidably thereon slidable to and from said fixed support (72);
   at least one adjustable shelf (130) comprising at least one set of rectangular components (91,92), each of said rectangular components (91,92) being positioned lengthwise side-by-side and having two transverse sides and two longitudinal sides,
   two parallelogram devices (80,81) for mounting said rectangular components on said horizontal guide rods (40,41), each of said parallelogram devices (80,81) comprising at least one set of X-shaped connected pairs of X-bars (82,83), (84,85), (123,124) and (134,135) including a first pair of said X-bars at one end of said set and a second pair of said X-bars at another end of said set, each of said X-bars in each of said pairs of said X-bars being pivotally connected with the other of said X-bars of said pair at a central articulation (90,90') and also being pivotally connected at each opposite end thereof by an end articulation (86,87) with another of said X-bars in an adjacent one of said pairs of X-bars, except that a lower end of an external one of said X-bars (82) of said first pair of said X-bars (82,83) is pivotally connected to one of said sliders (70,70'), while a lower end of an inner one of said X-bars (89) of said second pair of said X-bars is pivotally connected to one of said fixed supports (72) from which said one of said sliders (70,70') slides to and from, each of said rectangular components (91,92) being movably connected by each of said parallelogram devices (80,81) to each of said guide rods (40,41) and each of said transverse sides of each of said rectangular components being rigidly attached to one of said X-bars in one of said parallelogram devices so that, when said sliders (70,70') are positioned at a minimum distance from said fixed supports (72), all of said pairs of X-shaped bars (82,83), (84,85), (123,124), (134,135), 120,120') are standing substantially vertical and said rectangular components (91,92) also stand substantially vertical, each of said rectangular components being superposed over another leaving the loading space (11) substantially free, but, when said sliders (70,70') are moved from said minimum position adjacent said fixed supports (72), said X-bars become inclined from said vertical toward a substantially horizontal orientation and, when said sliders (70,70') have been moved as far as possible from said fixed supports (72), said rectangular components (91,92) are positioned in said substantially horizontal orientation resting against each other on said guide rods (40,41) thus forming an adjustable shelf.

2. A shelving apparatus according to claim 1, further comprising two pairs of uprights (13,14), each of said guide rods (40,41) being supported at each of said two ends by one of said uprights (13,14), each of said uprights having a cylindrical column (19,20) therein passing at least partially therethrough and a plurality of open, upwardly-inclined slots (32,33) opening toward said guide rod (40,41) to which said upright is connected, said open slots being spaced from each other above and below each other in each of said uprights, each of said guide rods having a pin (60) located in a horizontal slot (47) in said guide rod (40,41) in the vicinity of each of said opposing ends of said guide rod (40,41), said pin being formed so as to be engagable in at least one of said open upwardly-inclined slots (32,33) of said upright (13,14) to which said end of said guide rod is connectable, and each of said guide rods (40,41) also being provided with a throughgoing hole (49,50) in the vicinity of each of said opposing ends of said guide rods (40,41) through which one of said columns (19,20) passes so that said guide rods (40,41) can be moved from one of said upwardly-inclined slots (32,33) of said upright to another lower or higher one of said upwardly-inclined slots, when said pins (60) are slid in said horizontal slots (47) to an inward position in said guide rods so as to be released from said open slots (32,33) of said uprights.

3. A shelving apparatus according to claim 1, wherein one of the longitudinal sides of each rectangular component (90,91) has a longitudinally-grooved member (95) and another opposing one of the longitudinal sides of said each rectangular component has a tongue piece (94), said tongue piece (94) and said longitudinally-grooved member (95) being located on said each rectangular component so that, when said rectangular components are positioned in said substantially horizontal orientation to form said adjustable shelf, the tongue piece (94) of one of said rectangular components enters the longitudinally-grooved member (95) of an adjacent one of said rectangular components to form a groove-and-tongue joint so as to provide additional support for said adjustable shelf.

4. A shelving apparatus according to claim 1, further comprising another intermediate slider (71) slidably mounted on each of said guide rods (40,41) between said slider (70,70') and said fixed support (72) and wherein each of said parallelogram devices (80,81) comprises two sets of said X-shaped pivotally connected pairs of X-bars, said X-bars of said first set being pivotally connected to said fixed support and pivotally connected to said other intermediate slider (71), and said X-bars of said second set being pivotally connected to said intermediate slider (71) and said slider (70,70'), so that one set of said rectangular components (90,91) between said sliders (70,70') and said other intermediate slider (71) can be oriented substantially horizontally for loading of said goods, while another set of said rectangular components (90,91) between said other intermediate slider (71) and said fixed support (72) can be substantially vertically oriented.

5. A shelving apparatus, especially for a goods-carrying motor vehicle, mounted in a loading space into which goods are loaded and from which goods are unloaded, said shelving apparatus comprising:
  two horizontal guide rods (40,41), each of said guide rods having opposing ends, a fixed support (72) attached thereto, and a slider (70,70') mounted slidably on each of said guide rods slidable to and from said fixed support (72);
  at least one adjustable shelf (130) consisting of a plurality of rectangular components (91,92), each of said rectangular components (91,92) being positionable lengthwise side-by-side and having two transverse sides and two longitudinal sides,
  two foldable parallelogram devices (80,81) for mounting a set of said rectangular components on said horizontal guide rods (40,41), each of said parallelogram devices (80,81) comprising a set of pivotally-connected pairs of X-bars (82,83), (84,85), (123,124) and (134,135), each of said rectangular components (91,92) of said set being connected by each of said foldable parallelogram devices (80,81) to each of said guide rods (40,41), and each transverse side of each of said rectangular components being fixedly connected to one of said X-bars in said parallelogram device, so that, when said sliders (70,70') are positioned at a minimum distance from said fixed supports (72), all of said pairs of X-shaped bars (82,83), (84,85), (123,124), (134,135), 120,120') are standing substantially vertical and said rectangular components (91,92) also stand substantially vertical, one of said rectangular components (90,91) being superposed over another, but, when said sliders (70,70') are moved from said minimum position adjacent said fixed supports (72), said X-bars become inclined from said vertical toward a substantially horizontal orientation and, when said sliders (70,70') have been moved as far as possible from said fixed supports (72), said rectangular components (91,92) are positioned in said substantially horizontal orientation resting against each other and on said guide rods (40,41), thus forming the adjustable shelf.

* * * * *